United States Patent [19]

Barillec et al.

[11] Patent Number: 4,578,013

[45] Date of Patent: Mar. 25, 1986

[54] DEVICE FOR PICKING UP LOOSE ARTICLES

[75] Inventors: Christian Barillec, Tourcoing; Dominique Janvier, Lille; Marc Bonneton, Tourcoing, all of France

[73] Assignee: Societe Anonyme Redoute Catalogue, Roubaix, France

[21] Appl. No.: 578,865

[22] Filed: Feb. 10, 1984

[30] Foreign Application Priority Data

Nov. 29, 1983 [FR] France ................. 83 19256

[51] Int. Cl.[4] ............................................. B65G 3/04
[52] U.S. Cl. ...................... 414/323; 271/21; 294/1.1; 294/86.4; 414/304; 414/786
[58] Field of Search ............... 294/1 R, 19 R, 23.5, 294/24, 21, 66 A, 86 R, 106, 114, DIG. 1, DIG. 2; 271/19, 21, 118–120, 184; 414/123, 291, 292, 304, 416, 323, 786

[56] References Cited

U.S. PATENT DOCUMENTS

| | | | |
|---|---|---|---|
| 731,145 | 6/1903 | Wilbur | 294/19 R |
| 1,715,358 | 6/1929 | Harrold | 271/21 UX |
| 2,623,771 | 12/1952 | Forward | 294/23.5 |
| 3,239,263 | 3/1966 | Farmer et al. | 294/19 R |
| 3,776,584 | 12/1973 | Van Gerven | 294/21 |

FOREIGN PATENT DOCUMENTS 779068 11/1980 U.S.S.R. ................. 294/66 A

Primary Examiner—Johnny D. Cherry
Attorney, Agent, or Firm—Robert E. Burns; Emmanuel J. Lobato; Bruce L. Adams

[57] ABSTRACT

This device for picking up separately selected slack articles from a heap of articles disposed in a container comprises a movable handling arm adapted to be lowered into the container for picking up the selected article, for example a textile, just as it is or wrapped in a plasticizer film bag, and a pair of wheels rotatably mounted to the lower end of the handling arm and driven by suitable means. The handling arm is lowered into the container and then the wheels are caused to rotate in opposite directions in order to nip one article at a time therebetween. Finally, the arm is lifted off the container and the wheels are separated for releasing the article. The device is intended more particularly for use in the mail order trade.

9 Claims, 5 Drawing Figures

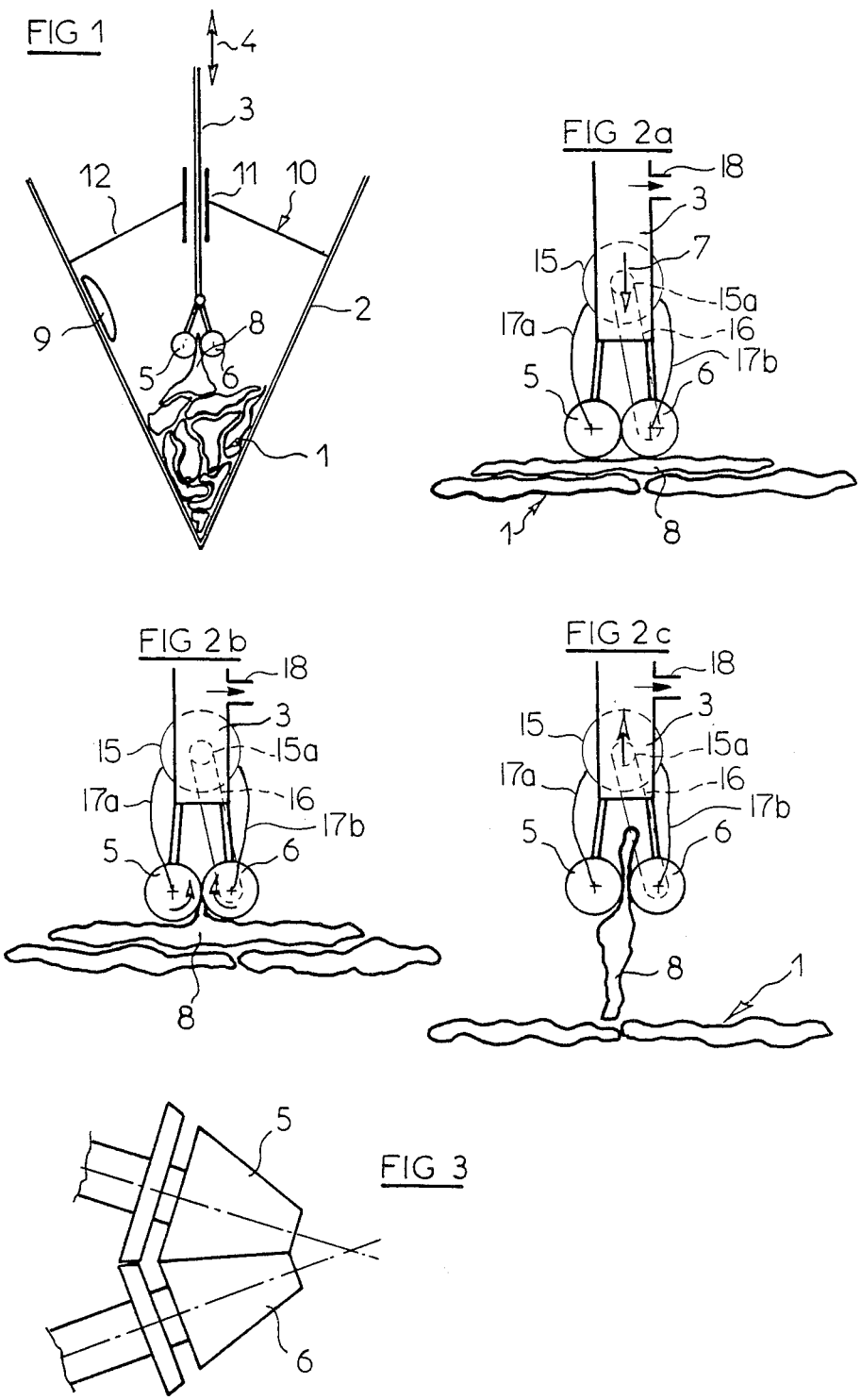

DEVICE FOR PICKING UP LOOSE ARTICLES

BACKGROUND OF THE INVENTION

1. Field of the Invention

The present invention relates to a device for picking up loose articles separately. It is applicable notably to the mail order industry.

2. The Prior Art

In many firms, and especially in the mail order industry, objects or articles of very different shapes and sizes are currently handled in storehouses.

Up to now the attempts made with a view to automatize such storehouse activities consisted mainly in providing fork lift trucks capable of handling standard crates or pallets.

The handling of unitary articles is extremely delicate when such articles occur in a number of different aspects.

More particularly, the handling of loose articles having an indefinite configuration, such as textiles, is particularly delicate. Practical tests have been conducted with handling arms remote controlled by operators who could check the arm movements on the screen of a closed-circuit or internal television receiver. Unfortunately, these tests rapidly proved to be inadequate since the use of TV cameras did not supply any perspective information to the operator who consequently was unable to determine the distances.

SUMMARY OF THE INVENTION

It is the primary object of the present invention to provide a device for the unitary picking up of articles, which is fully automatic in that it can operate blindly without any external intervention with a fair degree of success, that is, by picking up the articles one by one.

Since the device according to the present invention operates by itself, two certainties, namely that the article picked up is the selected article and that only one article has been picked up at a time, are obtained.

It is another object of this invention to provide a pick-up device capable of accepting the articles irrespective of their shape, more particularly articles which, by their inherent nature, are slack such as textiles, or for instance rigid objects packed in a plasticized film prone to deformation.

Another object of the present invention is to provide a device of the type set forth which is applicable to the picking up of loose goods. In fact, it is necessary in many circumstances to have the possibility of handling objects which have not necessarily been stowed beforehand according to a predetermined, well-established order, a condition requiring up to now the indirect use of man power or special, expensive machines.

Other objects and advantages of the present invention will appear as the following description proceeds, which is given by way of illustration, not of limitation.

The device for separately and selectively picking up miscellaneous loose articles which are inherently slack, such as textiles, or articles enclosed in flexible packings such as a plasticized film bag, is characterized by the fact that it comprises a movable handling arm adapted to be lowered into a container for picking up the selected article, a pair of wheels or rollers having their generatrices urged against each other, a driving member for imparting a rotary motion to said wheels so that they can nip the article directly or through its wrapper, bag or the like.

THE DRAWING

FIG. 1 illustrates diagrammatically in vertical section the pick-up device of this invention, FIGS. 2a, 2b and 2c illustrate diagrammatically the various steps of the operation of the device of this invention, and FIG. 3 illustrates also diagrammatically a preferred form of embodiment of the pair of wheels of the pick-up device.

DESCRIPTION OF THE PREFERRED EMBODIMENTS

The device for separately and selectively picking up miscellaneous loose articles according to the present invention is intended more particularly for the mail order industry. In fact, in this specific kind of trade an awkward task consists in picking up from various containers articles differing considerably from one another, which have been ordered by a customer, and then packing these articles and eventually dispatching them to the customer.

This invention is directed to provide an improved yet simple pick-up device which is particularly adapted for automatic operation. More particularly, the device according to the instant invention can operate not only without any manual intervention but also blindly, i.e. without any supervision from the outside.

The pick-up device according to the present invention is intended more particularly for picking up separately and selectively loose objects from a container. Thus, it is unnecessary to stow the objects or articles beforehand, and moreover the pick-up device of the present invention is capable of picking up only one article at a time. This of course constitutes the most difficult and delicate step. In fact, many well-known handling devices such as clamps, grippers or the like permit of picking up articles of any given configuration or shape; however, as a rule none of them warrants the faultless picking up of a single article at a time and gives the certainty that the selected article has really been picked up by the handling arm.

The device according to the present invention is adapted more particularly to pick up articles which, by their specific nature, are soft or slack, such as textiles or articles enclosed in a soft package such as plasticized film. Thus, the device of the present invention is adaptable to any type of article, for if the article were not soft or slack, it would only be necessary to put it into a soft or slack packing for enabling it to be handled by the device of the present invention.

FIG. 1 illustrates the various component elements of the pick-up device of the present invention.

Initially, the articles 1 are gathered into a container 2. These articles are disposed loosely therein and meet the deformability requirements either inherently or as a consequence of the means in which they are packed.

This device comprises a movable handling arm 3 adapted to travel for example in the storage room or storehouse, where the containers 2 are kept, for gripping the selected articles therefrom, this arm 3 being adapted to be lowered into the container 2 for this purpose.

It is essential that this arm 3 be movable vertically as shown by the arrow 4 of FIG. 1, the other movements likely to be executed by the arm 3 depending primarily on the drive means installed around the pick-up device. This device is designed more particularly for picking up only one article at a time from the container. After the pick-up means, other means within the knowledge and skill of those conversant with the art may be actuated for directing the picked up article toward a well-defined location or station, this complementary movement being not necessarily performed by the arm 3.

The device further comprises a pair of wheels 5, 6 having their generatrices pressed against each other. Drive means (not shown in FIG. 1) are provided for rotating the wheels 5, 6 when required. In FIGS. 2a-2c the dive means is shown schematically as a reversible motor unit 15 having a drive pulley 15a. A belt 16 is trained around the pulley 15a and the axle of the wheel 6. The wheel 5 is driven in the opposite direction by the wheel 6.

FIGS. 2a to 2c illustrate the steps of the pick-up operation. The arm 3 is firstly moved downwards as shown by the arrow 7 of FIG. 2a. The arm 3 is disposed initially above the container 2 so that during the downward movement of this arm 3 the wheels 5, 6 contact the articles 1 disposed loosely in the container, notably the wheels 5 and 6 settle on an article 8 at the top of the heap of articles 1 previously deposited into the container.

At the end of this preliminary or approach movement the drive means are operated for rotating the wheels 5 and 6 in opposite directions, as shown diagrammatically by the arrows in FIG. 2b so that the article 8 is nipped between the wheels 5 and 6. Consequently, the article 8 must be capable of undergoing a distortion without any consequence, this result being obtained by acting either on articles which as already explained are inherently soft or slack, or on articles of any configuration wrapped in a soft packing such as a plastic bag. Due to the deformability of this article 8, the latter will be caught between the wheels 5 and 6. To facilitate this operation, the peripheral surfaces of wheels 5 and 6 are advantageously lined with a material having a high coefficient of friction, such as rubber or a suitable plastic material.

The wheels 5 and 6 are mounted with a view to permit their movement away from each other and consequently the insertion of the article 8 therebetween. The pressure exerted by each wheel 5, 6 is adjusted according to the type of article to be picked up. Thus, in the case of relatively heavy articles, it is of course preferable to exert a relatively high pressure between the wheels, and in the case of relatively thick articles such as pullovers or coats, this force should be lesser or more limited, and the movements of the wheels 5, 6 away from each other should also take place without any detrimental consequence to permit the introduction of a thick product therebetween.

When the article 8 has been nipped between the wheels 5, 6 and picked up as illustrated in FIG. 2c, the handling arm 3 may be raised, this combined movement corresponding to the picking up of a single article 8 from the heap of loose articles 1.

The nipping of an article 8 between the wheels 5 and 6 may be detected or sensed by using various known means, notably an optical system disposed between the wheels 5 and 6 for detecting the presence of another object between the wheels 5 and 6.

Other means may be implemented. Thus, for example a relative spacing between the wheels 5 and 6 may be detected for signalling the presence of an object therebetween. It is also possible to use wheels made from a material treated to make them electrically conductive, so that when electric current is caused to flow in series through these wheels any non-conducting object or material clamped between the wheels will interrupt the current flow and may control the deenergization of the drive means. As shown schematically in FIGS. 2a-2c, the wheels 5 and 6 are connected in circuit with the motor unit 15 by electrical conductors 17a, 17b so as to interrupt the current to the motor unit when the two wheels are separated.

As already mentioned in the foregoing, it is essential to pick up only one article at a time and to this end it is necessary to utilize a device having a very small gripping surface which may be defined as consisting of the area located between the axes of rotation of the wheels 5 and 6 and is therefore limited by the wheel width.

Practical tests led to the conclusion that the use of wheels having a diameter within the range of 2 to 10 mm is satisfactory. Besides, the width of the wheels may be of the order of 3 cm.

It should be noted that the use of wheels or rollers of relatively small diameter improves the precision of the nipping action and more particularly the risk of picking up two or more articles at the same time is extremely low. On the other hand, an excessively small diameter is detrimental to the rigidity of the device.

Therefore, in a preferred form of embodiment of the present invention taper rollers 5 and 6 of the type shown diagrammatically in FIG. 3 are used.

The use of a small diameter, of the order of 3 mm. facilitates the drive and the initial nipping of the article or product, mainly on account of the short distance existing between on the one hand the initial points of contact between the wheels and the product to be picked up, and on the other hand the contact area between the two wheels performing the nipping movement.

The greater diameters of 8 to 10 mm are advantageous in that they improve the rigidity and the mechanical strength of the device while warranting a firm grip on the product or article.

Thus, the use of taper wheels or rollers 5 and 6 permits of combining the advantages of small diameter wheels with those of large diameter wheels.

In the example described and illustrated herein, the axes of rotation of the wheels are shown as being disposed substantially horizontally. However, it is also possible to set these wheels at an angle so as to reduce the gripping area and consequently the risk of picking up more than one article at a time.

Since it is contemplated to operate the pick-up device of the present invention without resorting to any external visual assistance, it is necessary that when the gripping arm 3 is lowered into the container 2 the wheels 5, 6 engage the articles 1 disposed therein. This requirement is met when the container has an outflared configuration as shown in FIG. 1. More particularly, a pyramidal or conical container having its vertex directed downwards may advantageously be used.

It is also desirable to prevent the articles disposed in the container 2 from remaining in the position shown in FIG. 1 at 9, for example as a consequence of an insufficient slope of the side walls of this container 2. Therefore, the pick-up device according to the present invention is advantageously provided with push means 10 adapted to push any article likely to adhere unduly to the inner walls of the container 2 back toward the bottom of this container.

A typical form of embodiment of this push means 10 is illustrated in FIG. 1 as comprising a socket 11 adapted to slide along the pick-up arm 3 and provided with peripheral prongs 12.

These prongs 12 are preferably made of a suitable flexible material, at least at their outer ends, so that they can efficiently sweep the inner surface of the container 2 and thus push down the articles likely to adhere to these surfaces.

The presence of the push means 10 avoids the occurrence of the so-called vault effect, well known to operators of hoppers and like devices.

Of course, other forms of embodiment of the present invention may be devised by those conversant with the art without departing from the basic principles of the invention.

Furthermore, it will be seen that the gripping or pick-up effect may be improved by providing a pneumatic suction device disposed above the wheels 5, 6 for attracting the object to be picked up between these wheels. The suction device shown schmatically in FIGS. 2a-2c as a suction connection 18. This suction device is operated simultaneously with the wheel rotation and stopped when the object is eventually disposed between the wheels.

It may also be contemplated to provide two or more endless belts disposed between pulleys so that one side of one belt be disposed side by side with and parallel to one side of the other belt. Thus, the object will be caught between the belts when they are set in motion.

Generally, the article picked up by the device of this invention is subsequently released by simply reversing the direction of rotation of the wheels.

What is claimed is:

1. A device for picking up loose articles one at a time said articles being inherently soft such as textiles or being packaged in a supple envelope such as a plasticized film bag, said articles being disposed in bulk in a flared container having an open top to provide access to said articles, said device comprising:
   a manipulatable mobile arm adapted to descend vertically through the opening of said container in order to lift one of the articles from the container,
   a pair of cylindrical wheels of small diameter rotatably mounted at a lower end of said arm, each of said wheels having a periphery and a concentric axis of rotation substantially perpendicular to the direction of vertical displacment of said arm, said wheels being mounted resiliently with their peripheries pressed against one another and being separable by entry of an article between them,
   means for driving said wheels continuously for rotation in opposite directions so as to nip an article or its envelope between them, and
   control means for detecting the presence of an article taken between the wheels and controlling said driving means to stop the rotation of said wheels.

2. A device according to claim 1 in which the cylindrical wheels have a diameter of the order of 5 to 15 mm and a width of the order of 5 mm.

3. A device according to claim 1 in which said wheels are electrically conductive and in which said control means comprises means for detecting whether or not said wheels are in electrical contact with one another.

4. A device according to claim 1, further comprising means for appying suction tending to draw an article or envelope between said wheels.

5. A device according to claim 1, further comprising means for pushing said articles toward the bottom of said container, said pushing means comprising a socket slidable on said arm and flexible prongs extending from said socket and engageable with articles in said container to push them toward the bottom of the container.

6. A method of picking up loose articles one at a time, said articles being inherently soft such as textiles or being packaged in a supple envelope such as a plasticized film bag, said articles being disposed in bulk in a flared container having an open top to provide access to said articles, said method comprising;
   providing a manipulatable mobile arm having on a lower end thereof a pair of cylindrical wheels of small diameter mounted for rotation about parallel, substantially horizontal axes of rotation, said wheels being concentric with their respective axes and being mounted resiliently with their peripheries pressed against one another and being separable by entry of an article between them,
   lowering said arm into said container to bring said wheels into engagement with an article in said container while continuously rotating said wheels in opposite directions so as to nip an article or its envelope between them,
   detecting the presence of an article taken between said wheels and thereupon stopping the rotation of said wheels, and
   lifting said arm with said article nipped between said wheels.

7. A method according to claim 6, in which said wheels are electrically conductive and in which the presence of an article between said wheels is detected by detecting whether or not said wheels are in electrical contact with one another.

8. A method according to claim 6, further comprising applying suction to draw an article toward and between said wheels.

9. A method according to claim 6, further comprising pushing articles in said container toward the bottom of said container as said arm is lowered into said container.

* * * * *